May 16, 1939.  C. B. SPASE  2,158,440
FRICTION CLUTCH MECHANISM
Filed July 31, 1936  2 Sheets-Sheet 1
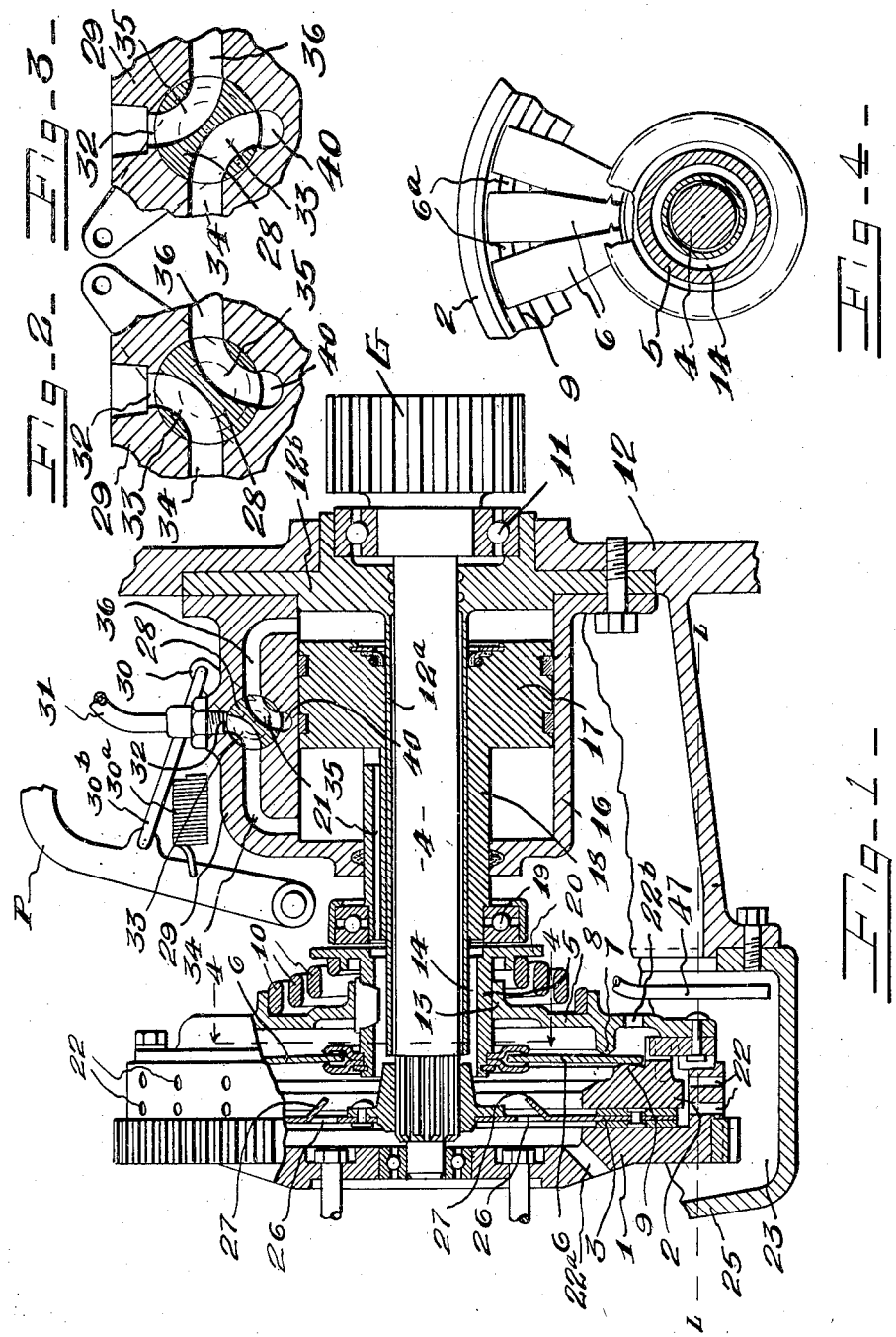
INVENTOR.
Charles B. Spase
BY Bodell & Thompson
ATTORNEYS.

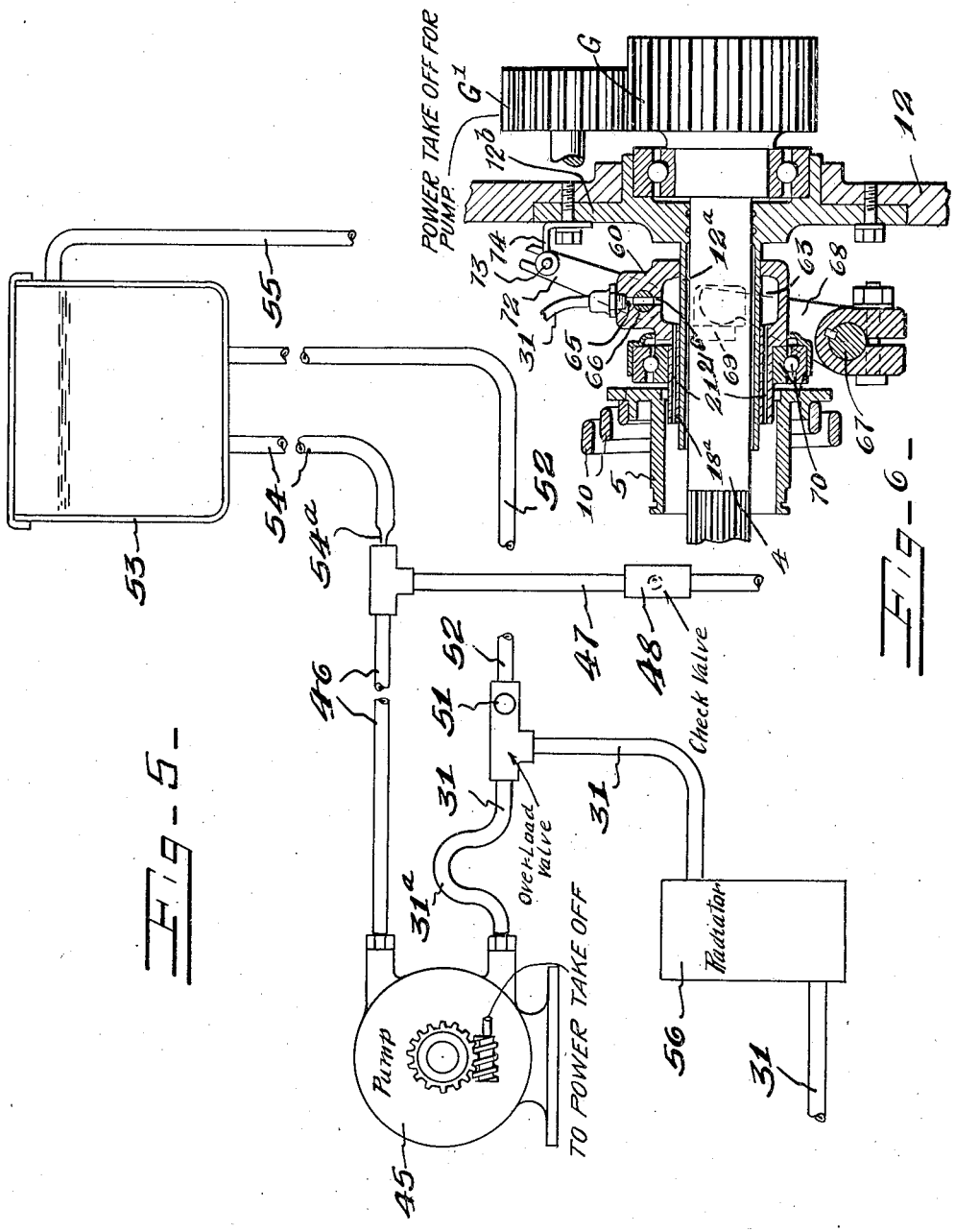

Patented May 16, 1939

2,158,440

UNITED STATES PATENT OFFICE 2,158,440

FRICTION CLUTCH MECHANISM

Charles E. Spase, Nedrow, N. Y., assignor to W. C. Lipe Inc., Syracuse, N. Y., a corporation of New York Application July 31, 1936, Serial No. 93,672

14 Claims. (Cl. 192—113)

This invention relates to friction clutches, such as are used in motor vehicles, and has for its object force feed means for projecting a cooling fluid into the interior of the clutch against or adjacent the friction faces, and more specifically the projection of oil into the interior of the clutch where it is thrown centrifugally outward on the friction elements. It further has for its object a construction by which cooling oil is projected into the clutch only when the clutch is engaged and the projection of oil discontinued when the clutch is disengaged, in order to avoid slippage of the clutch, due to excess oil, and burning off the oil when the clutch is again engaged.

One of the principal objects is also a valve controlled fluid operated mechanism for effecting the engaging and disengaging of the clutch, and thus relieving the operator of the physical effort of doing so, aside from operating the valve either by hand or by a clutch pedal.

It further has for its object a fluid operated means or fluid motor for operating the clutch to engage and disengage it and to hold it engaged, and the projection of the fluid, which is preferably oil, into the interior of the clutch to cool it, particularly when the clutch is engaged.

It further has for its object a particularly simple and compact construction and arrangement of fluid operated means or motor relatively to the clutch and also relatively to the gear box.

It also has for its object an oil system including a pump, a sump and a cooling chamber or radiator by which the oil is circulated through the fluid motor which actuates the clutch, thence to the clutch to cool the clutch, thence to the sump to the cooling radiator and back to the pump where it is recirculated. The circulating system also preferably includes an oil reservoir coupled into the system at the intake side of the pump to prime the pump and avoid shortage of oil in the system.

The invention consists in the novel features and in the combinations and constructions hereinafter set forth and claimed.

In describing this invention, reference is had to the accompanying drawings in which like characters designate corresponding parts in all the views.

Figure 1 is a longitudinal sectional view, partly in elevation, of the assembly of the clutch, the fluid operated means or motor therefor and the arrangement by which the fluid is projected into the interior of the clutch and the contiguous portions of the gear box and of the fly wheel and clutch housings.

Figures 2 and 3 are enlarged fragmentary sectional views illustrating the position of the control valve when the clutch is engaged and when the clutch is disengaged.

Figure 4 is a fragmentary sectional view on the plane of line 4—4, Figure 1.

Figure 5 is a diagrammatic view illustrating one arrangement of the elements of the oil circulating system.

Figure 6 is a fragmentary longitudinal sectional view similar to Figure 1 illustrating a construction in which the clutch is operated in the usual manner by an operator-operated lever or clutch pedal, yoke and throw-out collar and the fluid or oil is projected into the interior of the clutch to cool it.

This invention comprises, generally, in combination a friction clutch including a shiftable element shiftable into and out of engaged position, this usually being the driven element of the clutch, a force feed system for injecting a fluid, preferably oil, against the portions of the clutch element adjacent the frictionally engaged faces, this force feed means also including a valve controlled fluid operator motor connected to the clutch throw-out mechanism to operate the clutch. However, it will be understood that the oil cooling may be used alone or the fluid motor for operating the motor used alone but they are preferably combined together in one system, so that the motive fluid, as oil, used to operate the clutch and to hold the clutch engaged is also utilized to cool the clutch.

The clutch may be of any suitable form, size and construcion. That here shown comprises a driving element 1, which is usually the fly wheel of an internal combustion engine of the vehicle, a pressure ring 2 rotatable with the fly wheel, a driven element or disk 3 mounted on, and rotatable with a clutch shaft 4 and shiftable axially thereof, the disk 3 extending between the bottom of the recess in the fly wheel and the pressure ring 2, and a clutch mechanism including a throw-out sleeve 5, and motion transmitting and multiplying levers 6 extending outwardly from the inner end of the throw-out sleeve and coacting with a fulcrum 7 on the back plate 8 of the clutch and pressing on a fulcrum 9 on the pressure ring. Usually, as will be understood by those skilled in the art, a clutch spring 10 acts against the throw-out sleeve to operate the levers to engage the clutch and the throw-out sleeve is operable by a clutch pedal against the spring to disengage the clutch. The levers 6 have portions spaced apart forming spaces 6ª (Figure 4) so that the cooling oil can find its way out of the clutch to the sump to be described. Any suitable clutch may be substituted for that illustrated. As is well known, it is difficult to adequately cool the friction faces of clutches in motor vehicles, particularly of heavy duty clutches. Certain types of clutches, as metal faced clutches, develop much heat which heretofore has been extremely difficult, if not impossible, to adequately dissipate under all conditions.

The clutch shaft 4 is the driving shaft of a transmission gearing or is the stem of the drive gear G of the change speed transmission gearing. 11 is an antifriction bearing in which the shaft 4 is mounted, this bearing being supported, as will be hereinafter described, in the front wall 12 of the gear box.

The throw-out sleeve 5 of the clutch is slidably mounted in a hub 13 in the back plate 8 of the clutch and is spaced apart, at 14, from the periphery of the shaft 4.

The force feed means for supplying a cooling fluid, as oil, to the clutch and also for operating the clutch will now be described, as they are combined in one structure. The fluid motor for operating the clutch includes a movable element coacting with the throw-out sleeve 5. It comprises a cylinder 16 and a double acting piston 17 therein both mounted concentric with the clutch shaft 4. Suitable connections are interposed between the piston and the throw-out sleeve. As here illustrated, the piston has a tubular piston rod 18 concentric with the shaft 4 and extending through a stuffing box in the head of the cylinder, the rod 18 carrying a thrust bearing 19 at its outer end which coacts with a collar 20 on the outer end of the throw-down sleeve 5, the rod having passages, as a series of bores 21, extending lengthwise thereof and communicating at their inner ends with the interior of the cylinder on the side of the piston to which the pressure is applied when the clutch is engaged, these bores discharging into the space 14 and from thence into the interior of the clutch adjacent the hub of the driven element 3 where the oil is thrown outwardly centrifugally against the portions of the clutch element adjacent the frictionally engaged surfaces. The oil finds its way out through passages 22, 22ª, 22ᵇ in the driving element to a sump 23 in the lower portion of the fly wheel housing 25.

The piston 17 and its hollow connecting rod 18 are slidably mounted on a hollow stud or sleeve 12ª projecting from a base plate 12ᵇ secured to the front wall 12 of the gear box, the hollow stud or sleeve 12ª encircling the clutch shaft 4 and terminating at its free end within the clutch.

The disk 3 is formed with passages 26 therethrough and deflectors 27 for causing some of the oil to pass from the rear side of the disk 8 through the passages 26 to the front side, in order to cool the friction surface of the fly wheel of the driving element 1.

28 designates a control valve mounted in a boss 29 formed on the upper side of the cylinder 16, this controlling the flow of oil to the opposite sides of the piston 17. The valve here shown is a rotary valve of the so-called hour glass type. It is operated by a suitable lever 30 spring-pressed by a spring 30ª into the position shown in Figure 2, that is, the position occupied when the clutch is engaged. The lever 30 is connected to the clutch pedal P by a link 30ᵇ. The spring 30ª is here shown as connected to the clutch pedal P. Normally the clutch is engaged by letting up on the clutch pedal. This movement operates the valve into the position shown in Figure 2, wherein the oil passes from the intake pipe 31 through passage 32 in the valve casing, passage 33 in the valve 28, passage 34 in the valve casing to the left hand side of the piston 17, forcing the piston to carry the thrust bearing 19 away from the collar 20 on the throw-out sleeve 5, and permitting the clutch spring 10 to engage the clutch. The oil also passes out through the passages 21 into the interior of the clutch. When the valve is operated into the position shown in Figure 3, as by depressing the clutch pedal, the oil passes from the intake 31 through passages 32, 35 and 36 into the cylinder on the right hand side thereof, pressing the piston 17 to the left, causing the thrust bearing 19 to press against the collar 20 of the throw-out sleeve 5 and press the sleeve inwardly against the clutch spring 10 to disengage the clutch. The clutch will be held disengaged by the oil pressure as long as the pedal is depressed. The area of the face of the piston on the right hand side thereof is greater than that on the left hand side, in order to overcome the action of the spring and to force the oil out of the cylinder from the left hand end of the cylinder. When the valve 28 is operated into position, to engage the clutch (Figure 2), the passage 36 leading from the left hand end of the cylinder communicates with an exhaust passage 40, and when the valve 28 is operated into the position shown in Figure 3, the passage 35, as seen in Figure 1, communicates with the exhaust passage 40. The oil from the exhaust passage 40 passes into the sump 23.

The oil circulating system includes a pump 45 having its intake connected by pipes 46 and 47 to the sump, the pipe 47 having a suitable check valve 48 therein. The purpose of the check valve will be hereinafter described. The discharge side of the pump is connected by the pipe 31 to the valve 28. An overload valve 51 is located in a by-pass 52 between the outlet of the pump and the pipe 31. The pipe 52 leads to a reservoir 53. The reservoir 53 is connected by a pipe 54 to the pipe 46. The pipe 54 is of less diameter than the pipe 46 or is contracted as at 54ª in order that the pump will draw primarily through the pipe 47 and not draw the oil from the reservoir 53 faster than it is pumped in through the by-pass 52. The pipe 31 is formed with a trap 31ª in order to prevent the pump from draining completely, when the motor vehicle or its power plant remains idle over a long period of time as over-night or for days.

The check valve 48 prevents draining of oil back through the pipe 47 when mechanism is idle so that the pump starts to pump the oil as soon as the pump is actuated and also prevents the oil from the reservoir from draining through the pipes 54 and 47 into the sump.

The reservoir is provided with an overflow pipe 55 discharging into the sump. A suitable oil cooler or radiator 56 may be located either in the pipe 47 or the pipe 31. The pump is actuated by any suitable power take-off from the transmission gearing. However, as power take-offs from the transmission are well known, a description thereof is thought to be unnecessary.

The power may be taken off from the transmission gearing from the drive gear G or any other of the gears in the gear box rotating with the drive gear G, preferably when the transmission gearing is in neutral. In Figure 6, power is taken off gear G' and is shown meshing with the gear G and mounted upon a power-take-off shaft extending through the front wall 12 of the transmission gearing and having a driving connection with the pump shaft, as shown in Figure 5.

The pump is preferably located as near as possible to the sump and the radiator and reservoir in any convenient location outside the fly wheel and clutch housings. The other elements are located in any convenient space available.

Oil is constantly being pumped through the overload valve 51 and keeps the reservoir 53 full for priming the pump and compensating for leakage or seeping away of the oil. However, the system is originally filled so that the sump, when the mechanism is idle, is at a certain level, as indicated by the letter "L" in Figure 1. The reservoir 53 tends to maintain sufficient oil in the system until the level in the sump falls so low that no oil can be pumped.

In Figure 6 is illustrated a construction in which the clutch is thrown out or operated by a clutch pedal instead of by the fluid pressure, as in Figure 1, but the interior of the clutch is cooled by the oil in the same manner as in Figure 1.

In Figure 6, the throw-out sleeve 5 is operated by a member, as a collar 60, slidably mounted on the tubular stud 12ᵃ enclosing the clutch shaft 4, this member 60 having an elongated hub 18ᵃ slidably mounted on the stud 12ᵃ and corresponding to the hollow piston rod 18 of the construction shown in Figure 1. The member or head 60 is formed with an internal annular oil chamber 63 which communicates with a series of passages 21 extending lengthwise of the hub 18ᵃ and discharging into the throw-out sleeve 5 into the interior of the clutch and corresponding to the passages 21 (Figure 1), and also with a valve controlled inlet 65 communicating with the chamber 63 and with the oil supply pipe 31, as in Figure 1.

66 designates the valve in the passage 65, this being a normally open cut-off valve which is open when the clutch is engaged in order that oil to cool the interior of the clutch may be projected into the clutch. The valve is closed by the throwing out or disengaging of the clutch by the operator depressing the clutch pedal. The clutch pedal operates the usual throw-out shaft 67 having yoke arms 68 which press against shoulders, as the shoulder 69, on opposite sides of the member or head 60. The member or head 60 has a thrust bearing 70 for thrusting against the throw-out sleeve or collar 5 when the clutch pedal is depressed and operating the clutch to disengage the same in the usual manner. An oil duct or ducts 21ᵇ leads from one or more of the passages 21 to the thrust bearing 70. The valve 66 is automatically operated during the depressing of the clutch pedal, by a rock arm 72 connected to the valve 66 and pivoted at 73 through a pin-and-slot connection to a point fixed from movement as a bracket 74 carried by the plate 12ᵇ. Obviously, when the clutch pedal is depressed to move the member or head 60 to the left to press the throw-out sleeve 5 and compress the clutch spring 10, the rock arm 72 being held from movement will rock, and rotate the valve 66 to close the passage 65 so that oil is cut off while the clutch is disengaged.

What I claim is:

1. In a friction clutch including a shiftable member shiftable into and out of engaged position, and operating means for the shiftable clutch member, the combination of force feed means for injecting oil into the clutch against the portion of the clutch adjacent the friction face, when the shiftable member is in engaged position, including a conduit having a control valve therein and connections between the valve and said operating means to close the valve, when said operating means is operated to shift the shiftable clutch member out of its engaged position.

2. In a friction clutch including a shiftable member shiftable into and out of engaged position, and operating means for the shiftable clutch member, the combination of force feed means for injecting oil into the clutch against the portion of the clutch adjacent the friction face, when the shiftable member is in engaged position, said force feed means including a circulating system including a sump into which the discharged oil drains and a pump having its intake arranged to draw oil from the sump and passages communicating with the outlet of the pump and discharging into the clutch, a valve controlling said passages and connections between the valve and the operating means for operating the valve to close said passages when the operating means is operated to shift the shiftable member out of engaged position.

3. In a friction clutch including a shiftable member shiftable into and out of engaged position, and operating means for the shiftable clutch member, the combination of force feed means for injecting oil against the portion of the clutch adjacent the friction face, when the shiftable member is in engaged position and including mechanism operable to automatically discontinue the injecting of the oil when the shiftable member is in disengaged position, said mechanism including a conduit from the force-feed means, a valve in the conduit, and connections between the valve and said operating means operable to close the valve, when the shiftable member is shifted out of engaged position.

4. In a friction clutch including a shiftable member, the combination of force feed means for controlling the shiftable member to engage and disengage the clutch and for injecting oil into the clutch to cool the same while the clutch is engaged, the force-feed means including a conduit means discharging oil into the clutch, a valve in said conduit means, an operating member for the valve operable to close the conduit means, when the operating member is operated in position to cause the force-feed means to disengage the clutch.

5. In a friction clutch including a shiftable member, the combination of force feed means for controlling the shiftable member to engage and disengage the clutch and for injecting oil into the clutch to cool the same while the clutch is engaged and operable to automatically cut out the injecting of oil when the clutch is disengaged, the force-feed means including a conduit means for the oil, the conduit means having a control valve therein, the conduit means having a branch arranged to discharge oil into the clutch, an operating member for the valve and operable into position to close said branch, when the valve is operated by the operating member to effect the disengagement of the clutch.

6. The combination with a friction clutch including driving and driven frictionally engaged elements, one of which is shiftable axially into and out of engagement with the other, clutch operating mechanism including a throw-out sleeve, and a clutch shaft the shiftable element being mounted concentric with said shaft, the throw-out sleeve being mounted concentric with the clutch shaft, of valve-controlled fluid-operated means having a movable member coacting with the throw-out sleeve to engage and disengage the clutch, and having a passage arranged to discharge fluid into the interior of the clutch centrally thereof into position where it is thrown centrifugally outwardly against the friction elements to cool the same.

7. The combination with a friction clutch including driving and driven frictionally engaged elements, one of which is shiftable axially into and out of engagement with the other, clutch mechanism including a throw-out sleeve mounted concentric with and spaced from the clutch shaft, of a cylinder for motive fluid and a double acting piston therein mounted concentric with the clutch shaft, the piston having a tubular piston rod concentric with the shaft and formed with outlet passages for the flow of the fluid into the space between the throw-out sleeve and the shaft and into the interior of the clutch, the piston rod coacting with the throw-out sleeve to operate the same and a valve for controlling the flow of motive fluid to and from opposite sides of the piston.

8. The combination with a friction clutch including driving and driven frictionally engaged elements, one of which is shiftable axially into and out of engagement with the other, and clutch mechanism including a throw-out sleeve mounted concentric with and spaced from the clutch shaft, of a cylinder for motive fluid and a double acting piston therein mounted concentric with the clutch shaft, the piston having a tubular piston rod concentric with the shaft and formed with outlet passages for the flow of the fluid into the space between the throw-out sleeve and the shaft and into the interior of the clutch, the piston rod coacting with the throw-out sleeve to operate the same and a valve for controlling the flow of motive fluid to opposite sides of the piston, said passages communicating with the cylinder on the side of the piston to which the fluid pressure is applied when the clutch is engaged.

9. The combination of a gear box having a bearing opening therein, a plate mounted on the wall of the gear box and having a bearing hub extending into said opening, the plate having an elongated hub on the outer side thereof, a gear having a shaft journalled in said bearing and extending through the elongated hub beyond the outer end of the same, the shaft constituting a clutch shaft, a friction clutch including driving and driven elements, the driven element being mounted on the end of the shaft and shiftable axially thereof, clutch mechanism including a throw-out sleeve mounted concentric with the shaft, a cylinder supported by said plate concentric with the elongated hub, a double acting piston in the cylinder slidable on said elongated hub and having a tubular rod around the hub, extending outside the cylinder and coacting with the throw-out sleeve, and valve means for controlling the flow of motive fluid to the cylinder on opposite sides of the piston, the throw-out sleeve being spaced apart from the shaft and the tubular piston rod having lengthwise passages from the interior of the cylinder on the side of the piston to which pressure is applied when the clutch is engaged, said passages being arranged to discharge into the space within the throw-out sleeve and into the interior of the clutch.

10. In a friction clutch including a shiftable element, shiftable into and out of engaged position, the combination of a double acting cylinder and piston motor, the piston being connected to the shiftable element for controlling the shifting thereof, force-feed means for supplying motive fluid to the cylinder including a conduit connecting the force-feed means and the cylinder, and a conduit arranged to discharge into the clutch, the last conduit being arranged to receive fluid under pressure from the cylinder, when the piston is operated into engaged position, a control and reversing valve in the first conduit operable to control the flow of fluid to the cylinder, and an operating member for the valve.

11. In a friction clutch including alined driving and driven elements having frictionally engaged faces, a clutch shaft on which the driven element is mounted, the driven element being shiftable axially into and out of engaged position, and clutch operating mechanism including a throw-out sleeve located out of the plane of the engaged faces, the throw-out sleeve being mounted concentric with and spaced from the clutch shaft in the rear of the driven element and force-feed means for forcing oil through the space between the sleeve and the clutch shaft beyond the inner end of the sleeve to a point adjacent the driving element, whereby the oil is thrown centrifugally outward from beyond the end of the sleeve against portions of the clutch adjacent the friction faces.

12. In a friction clutch including alined driving and driven elements having frictionally engaged faces, the driven element being shiftable axially into and out of engaged position, and clutch operating mechanism including a throw-out sleeve located out of the plane of the engaged faces, the combination of force-feed means for forcing oil through the sleeve beyond the inner end of the same to a point adjacent the driving element, whereby the oil is thrown centrifugally outward from beyond the end of the sleeve against portions of the clutch adjacent the friction faces, the sleeve terminating at its inner end short of the driven element and the driven element having openings through which some of the oil is projected from the end of the sleeve and passes from one side of the driven element to the other.

13. In a friction clutch including alined driving and driven elements having friction faces, a clutch shaft on which the driven element is mounted, the driven element being shiftable into and out of engaged position, a pressure ring and mechanism for operating the pressure ring including a throw-out sleeve mounted concentric with and spaced from the clutch shaft in the rear of the driven element and out of the plane of the friction faces, the combination of force-feed means for projecting the oil through the space between the throw-out sleeve and the clutch shaft beyond the end of said sleeve to a point adjacent said elements, whereby the oil is thrown centrifugally outward against portions of the clutch adjacent the friction faces.

14. In a friction clutch including alined driving and driven elements having friction faces, a clutch shaft on which the driven element is mounted, the driven element being shiftable into and out of engaged position, a pressure ring and mechanism for operating the pressure ring including a throw-out sleeve mounted concentric with and spaced from the clutch shaft in the rear of the driven element and out of the plane of the friction faces, the combination of force-feed means for projecting the oil through the space between the throw-out sleeve and the clutch shaft beyond the end of said sleeve to a point adjacent said elements, whereby the oil is thrown centrifugally outward against portions of the clutch adjacent the friction faces, the driven element having transverse passages, and means for deflecting some of the oil to the opposite side of the driven element through said passages.

CHARLES B. SPASE.